C. L. BLAIR & V. I. BRINKER.
SPRING WHEEL.
APPLICATION FILED DEC. 20, 1915.
1,197,254.
Patented Sept. 5, 1916.
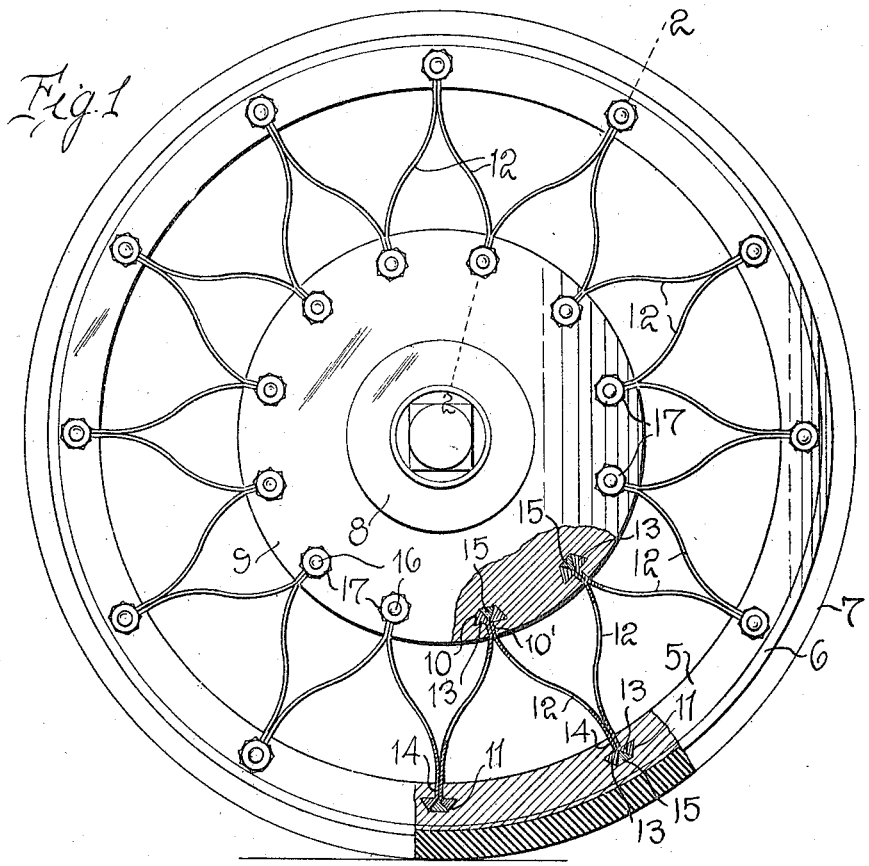
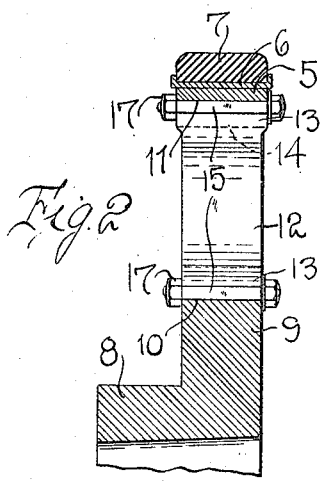
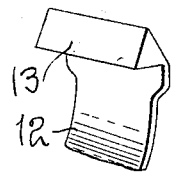
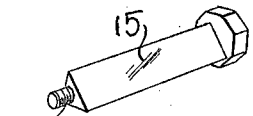
Inventor
CHARLES L. BLAIR
V. I. BRINKER
By Watson E. Coleman
Attorney

UNITED STATES PATENT OFFICE.

CHARLES L. BLAIR AND VICTOR I. BRINKER, OF VANDERGRIFT, PENNSYLVANIA.

SPRING-WHEEL.

1,197,254.

Specification of Letters Patent.

Patented Sept. 5, 1916.

Application filed December 20, 1915. Serial No. 67,855.

*To all whom it may concern:*

Be it known that we, CHARLES L. BLAIR and VICTOR I. BRINKER, citizens of the United States, residing at Vandergrift, in the county of Westmoreland and State of Pennsylvania, have invented certain new and useful Improvements in Spring-Wheels, of which the following is a specification, reference being had to the accompanying drawings.

This invention relates to spring wheels for automobiles and similar vehicles, of that type wherein the cushioning means is embodied in the spokes so that a solid tire tread instead of the usual pneumatic tire may be employed.

It is the primary object of the present invention to provide a wheel of the above character having a plurality of spring spokes, each consisting of a pair of spring plates of compound longitudinal curvature, and means whereby the outer ends of the spokes in each pair may be quickly and securely fixed to the wheel felly, and the inner ends of the contiguous plates in adjacent spokes similarly secured to the wheel hub.

The invention has for another and more particular object to provide a wheel, the felly and hub of which are provided with spaced dove-tail shaped recesses, resilient spoke elements, and relatively heavy terminal polygonal shaped bars for engagement in said recesses, and bolts adapted to be fitted through said recesses between the terminal bars and co-act with said bars to clamp the same between the opposed side walls of the recesses.

The invention has for a further general object to produce a resilient or spring wheel of the above type which is exceedingly simple and durable in its construction, and in which the spokes may be very easily and quickly removed or arranged in position and securely connected at their ends to the felly and hub of the wheel, respectively.

With the above and other objects in view, our invention consists in the novel features of construction, combination and arrangement of parts to be hereinafter more fully described, claimed and illustrated in the accompanying drawing, in which, Figure 1 is a side elevation of a vehicle wheel constructed in accordance with the preferred embodiment of our invention, portions of the felly and hub being shown in section; Fig. 2 is a transverse section taken on the line 2—2 of Fig. 1; Fig. 3 is an enlarged detail fragmentary perspective view of one of the spoke members; Fig. 4 is a similar view of one of the fastening bolts.

Referring in detail to the drawing, 5 designates the wood felly of the wheel upon which the usual circumscribing metal felly band 6 is engaged and secured in any approved manner.

7 indicates a solid rubber tire which is secured upon the felly band and this tire may be of any desired cross-sectional configuration.

The hub 8 of the wheel is formed with an annular flange 9 on one end and this flange is provided with a plurality of transverse channels or openings 10. Slots or kerfs 10' extend from said openings outwardly to the periphery of the flange 9. A similar series of equi-distantly spaced dove-tailed channels is also formed in the outer face of the wood felly of the wheel, as indicated at 11, said latter channels being alternately disposed with respect to the dove-tailed channels 10 in the hub flange 9.

The wheel structure is rendered elastic or resilient by means of a plurality of spring spokes, each of which consists of a pair of resilient or spring plates 12, which are of compound longitudinal curvature, as shown. These plates 12 are substantially equal in width to the width of the hub flange 9 and the inner face of the wheel felly 5. At their opposite ends, each spoke plate is formed with a relatively heavy triangular shaped enlargement or bar 13 extending across the entire width thereof. It is to be noted from reference to Fig. 1 that the bar 13 on the outer end of the plate 12 projects laterally from one face of the plate while the bar 13 on the opposite or inner end projects laterally from the other face of said plate. In arranging the spokes in position, the outer curved end portions of the two plates constituting each spoke are engaged upon each other, and the laterally offset bars 13 are moved longitudinally into one of the channels or grooves 11 in the wheel felly. Radially disposed slots or kerfs 14 communicate with each of the channels 11 which receive the bars 13. The bars 13 on the inner ends of the contiguous plates 12 in adjacent spokes are engaged in a similar manner in the channels 10 in the hub flange 9, the inner ends of said spokes fitting into the kerfs or slots 10'.

After the spoke plates have been mounted between the hub and felly of the wheel in the manner above stated, the bolts 15 are inserted between the bars 13 in the channels or openings provided in the hub and felly of the wheel. These bolts are also of triangular shape in cross section and exert a clamping pressure against the opposed inclined faces of the bars 13, thus tending to force the same in opposite directions and into tight frictional engagement against the inclined side walls of the channels or openings in which they are fitted. Each bolt 15 is provided with a head on one end and the other end thereof has a cylindrical reduced portion 16 which is threaded to receive a nut 17. In this manner, it will be apparent that the plates 12 of the spring wheel spokes may be easily and securely fixed at their ends in the felly and hub of the wheel and the possibility of their detachment in the use of the wheel obviated. Should any one of the spring plates break, however, the same may be quickly and easily removed by simply removing the bolts 15 and replaced by a new plate.

From the foregoing description, taken in connection with the accompanying drawings, the construction, manner of use and several advantages of our invention will be clearly and fully understood.

While we have illustrated in the drawing a particular shape or configuration of the spring plates constituting the wheel spokes, it is manifest that our improved fastening or securing means may be utilized in connection with spoke plates of various other forms. The strain or pull of the plates in the action of the wheel can have no loosening effect upon the fastening connections as the relatively heavy reinforcing terminal bars 13 on the spring plates are tightly clamped in place by the triangular-shaped bolts.

While we have shown and described the preferred form and construction of the several detailed features of the device, it is to be understood that the same is susceptible of considerable modification and we therefore reserve the privilege of adopting all such legitimate changes as may be fairly embodied within the spirit and scope of the appended claim.

Having thus described this invention, what we claim is:—

A spring wheel including a wheel hub and a felly, each provided with spaced transversely extending dovetailed channels and kerfs leading thereto, spring spoke plates having triangular-shaped terminal enlargements projecting from the relatively opposite sides of the plates, the enlargements of the contiguous spoke plates being adapted to be fitted into the channels in the wheel hub and felly, and the contiguous portions of the spoke plates engaging in the kerfs, and triangular-shaped bolts adapted to be fitted through said channels between the enlarged terminals of the plates to exert a clamping action upon the latter to force the same into frictional binding engagement against the side walls of the channels.

In testimony whereof we hereunto affix our signatures in the presence of two witnesses.

CHARLES L. BLAIR.
VICTOR I. BRINKER.

Witnesses:
GEORGE ROBERT BENJAMIN,
SYLVESTER M. MARSHALL.